(12) United States Patent
Nakamura et al.

(10) Patent No.: US 11,341,737 B2
(45) Date of Patent: May 24, 2022

(54) ESTIMATION APPARATUS, ESTIMATION METHOD, AND COMPUTER PROGRAM PRODUCT

(71) Applicant: KABUSHIKI KAISHA TOSHIBA, Minato-ku (JP)

(72) Inventors: Norihiro Nakamura, Kawasaki (JP); Akihito Seki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 299 days.

(21) Appl. No.: 16/803,507

(22) Filed: Feb. 27, 2020

(65) Prior Publication Data
US 2021/0064914 A1 Mar. 4, 2021

(30) Foreign Application Priority Data

Aug. 30, 2019 (JP) .............................. JP2019-158675

(51) Int. Cl.
*G06V 10/75* (2022.01)
*G06F 17/16* (2006.01)
*G06K 9/62* (2022.01)
*G06N 3/04* (2006.01)

(52) U.S. Cl.
CPC ............ *G06V 10/757* (2022.01); *G06F 17/16* (2013.01); *G06K 9/6251* (2013.01); *G06N 3/0472* (2013.01)

(58) Field of Classification Search
CPC ..... G06V 10/757; G06F 17/16; G06K 9/6251
See application file for complete search history.

(56) References Cited

U.S. PATENT DOCUMENTS

2020/0125957 A1* 4/2020 Lu ........................ G06F 16/9024
2020/0139973 A1* 5/2020 Palanisamy ............ G08G 1/167

FOREIGN PATENT DOCUMENTS

JP 2019-003527 A 1/2019
JP 2019-008571 A 1/2019

OTHER PUBLICATIONS

Charles Qi, et al., "PointNet: Deep Learning on Point Sets for 3D Classification and Segmentation", CVPR 2017, pp. 652-660.
Yarin Gal, et al., "Dropout as a Bayesian Approximation: Representing Model Uncertainty in Deep Learning", ICML, arXiv: 1506.02142v6, Oct. 4, 2016, 12 pages.

* cited by examiner

*Primary Examiner* — Fayyaz Alam
(74) *Attorney, Agent, or Firm* — Oblon, McClelland, Maier & Neustadt, L.L.P.

(57) ABSTRACT

An estimation apparatus according to an embodiment of the present disclosure includes a memory and a hardware processor coupled to the memory. The hardware processor is configured to: acquire first point cloud data; generate, from the first point cloud data, second point cloud data in which an attention point and at least one observation point are combined, the attention point gaining attention as a target of attribute estimation; and estimate an attribute of the attention point by calculating, for each attribute, a belonging probability of belonging to the attribute by using the second point cloud data.

27 Claims, 11 Drawing Sheets

ESTIMATION APPARATUS, ESTIMATION METHOD, AND COMPUTER PROGRAM PRODUCT

CROSS-REFERENCE TO RELATED APPLICATIONS

This application is based upon and claims the benefit of priority from Japanese Patent Application No. 2019-158675, filed on Aug. 30, 2019; the entire contents of which are incorporated herein by reference.

FIELD

Embodiments described herein relate generally to an estimation apparatus, an estimation method, and a computer program product.

BACKGROUND

Along with the progression in the aging of plant and social infrastructure, the demand for maintenance management and repairs for those is increasing, so that attempts to measure the current situations and digitally manage them have been carried out. Managing important places by images and the like has mainly been performed in such attempts. Due to the ease of understanding of a total image and the applicability to physical analysis, management in three-dimensional data has begun to be used. In particular, with the background of the reduction in weight, cost, and the like of laser range finders, the accumulation of point cloud data is progressing. In utilizing those actually, there is a need to edit the point cloud data to delete unnecessary data and to generate data usable in CAD based on the accumulated data. These operations are carried out manually at present and are very time-consuming work. Hence, techniques of automatically estimating what each point represents from the location of point cloud data, its accompanying color information, and the like have been developed.

DETAILED DESCRIPTION

According to an embodiment of the present disclosure, an estimation apparatus includes a memory and a hardware processor coupled to the memory. The hardware processor is configured to: acquire first point cloud data; generate, from the first point cloud data, second point cloud data in which an attention point and at least one observation point are combined, the attention point gaining attention as a target of attribute estimation; and estimate an attribute of the attention point by calculating, for each attribute, a belonging probability of belonging to the attribute by using the second point cloud data.

With reference to the accompanying drawings, the following describes in detail exemplary embodiments of an estimation apparatus, an estimation method, and a computer program product.

First Embodiment

An example of a functional configuration of an estimation apparatus 100-1 according to a first embodiment will be described.

Example of Functional Configuration

Figure 1:
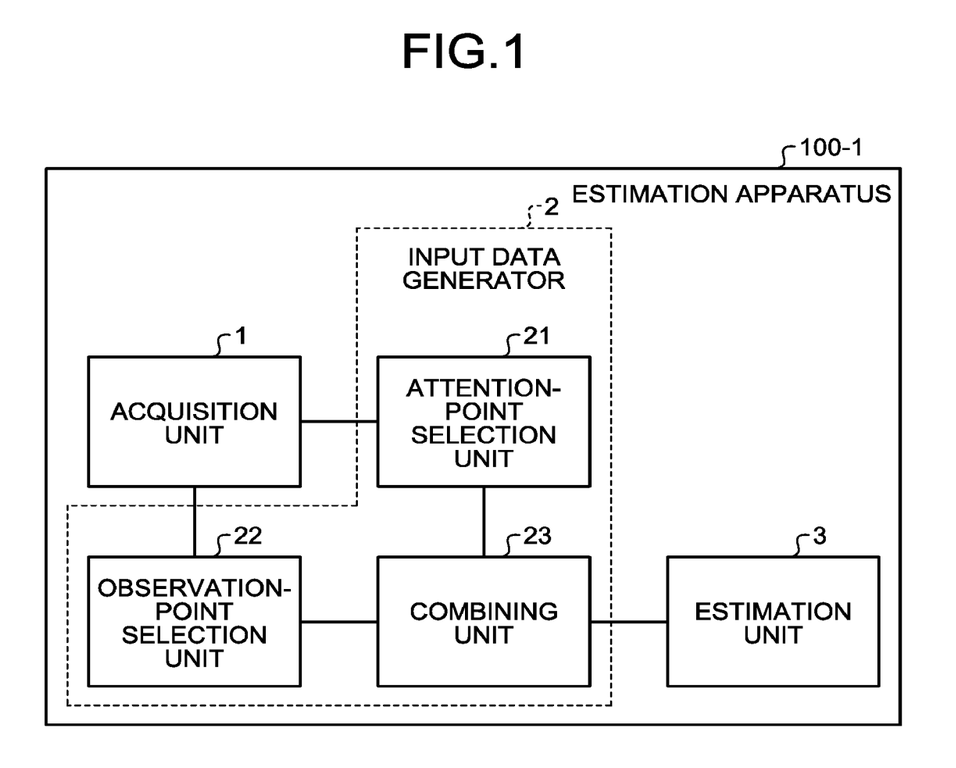
FIG. 1 is a diagram illustrating an example of a functional configuration of an estimation apparatus according to a first embodiment.

FIG. 1 is a diagram illustrating an example of a functional configuration of the estimation apparatus 100-1 of the first embodiment. The estimation apparatus 100-1 of the first embodiment includes an acquisition unit 1, an input data generator 2, and an estimation unit 3. The input data generator 2 includes an attention-point selection unit 21, an observation-point selection unit 22, and a combining unit 23.

Each function illustrated in FIG. 1 may be implemented by a separate device. In this case, each device is in a state capable of performing communication directly or indirectly via a communication network and each device is capable of transmitting and receiving point cloud data and the like with one another. The type of the communication network is optional, and each device may be in a mode capable of performing communication with one another via a local area network (LAN) installed in a building, for example. Furthermore, each device may be in a mode capable of performing communication with one another via a network (or clouds) such as the Internet, for example.

The acquisition unit 1 acquires first point cloud data X to be an object of identification from an external storage device, a three-dimensional measurement device, and the like. The first point cloud data X includes at least three-dimensional position coordinates (x, y, z). The first point cloud data X may include, depending on the measurement method, color information (r, g, b), laser reflection intensity information i, and the like. When there is information calculated in advance in various methods, such information may be included.

Examples of the external storage device are not limited to a storage medium such as a hard disk and a CD, but include a server connected via the communication network. Examples of a three-dimensional measuring device include a laser range finder, a stereo camera, or the like. In the case of a stereo camera, a three-dimensional point can be obtained by estimating the depth of each pixel based on an image.

The attention-point selection unit 21 selects, from the first point cloud data X acquired by the acquisition unit 1, an attention point Cp that gains attention as a target of attribute estimation. The attribute represents information that identifies what the attention point Cp represents, for example.

For simplifying explanation, the following describes an example in which the attention point Cp is a single point. Alternatively, the attention-point selection unit 21 is capable of also selecting two or more attention points Cp. In the case where two or more attention points Cp are selected, processing can be applied to each individual attention point Cp.

The observation-point selection unit 22 randomly selects, from the first point cloud data X acquired by the acquisition unit 1, observation points s of a predetermined number m. In the following description, an aggregate of a plurality of selected observation points s is referred to as an observation point cloud S. The selection method of the observation point cloud S is not limited to being random, and it only needs to be randomly selected according to a certain probability distribution (selection probability). Thus, the observation point cloud S may be selected with a selection probability other than an equal selection probability.

The combining unit 23 generates, from the attention point Cp and the observation point cloud S, second point cloud data X' as input data for estimating the attribute of the attention point Cp.

Figure 2:
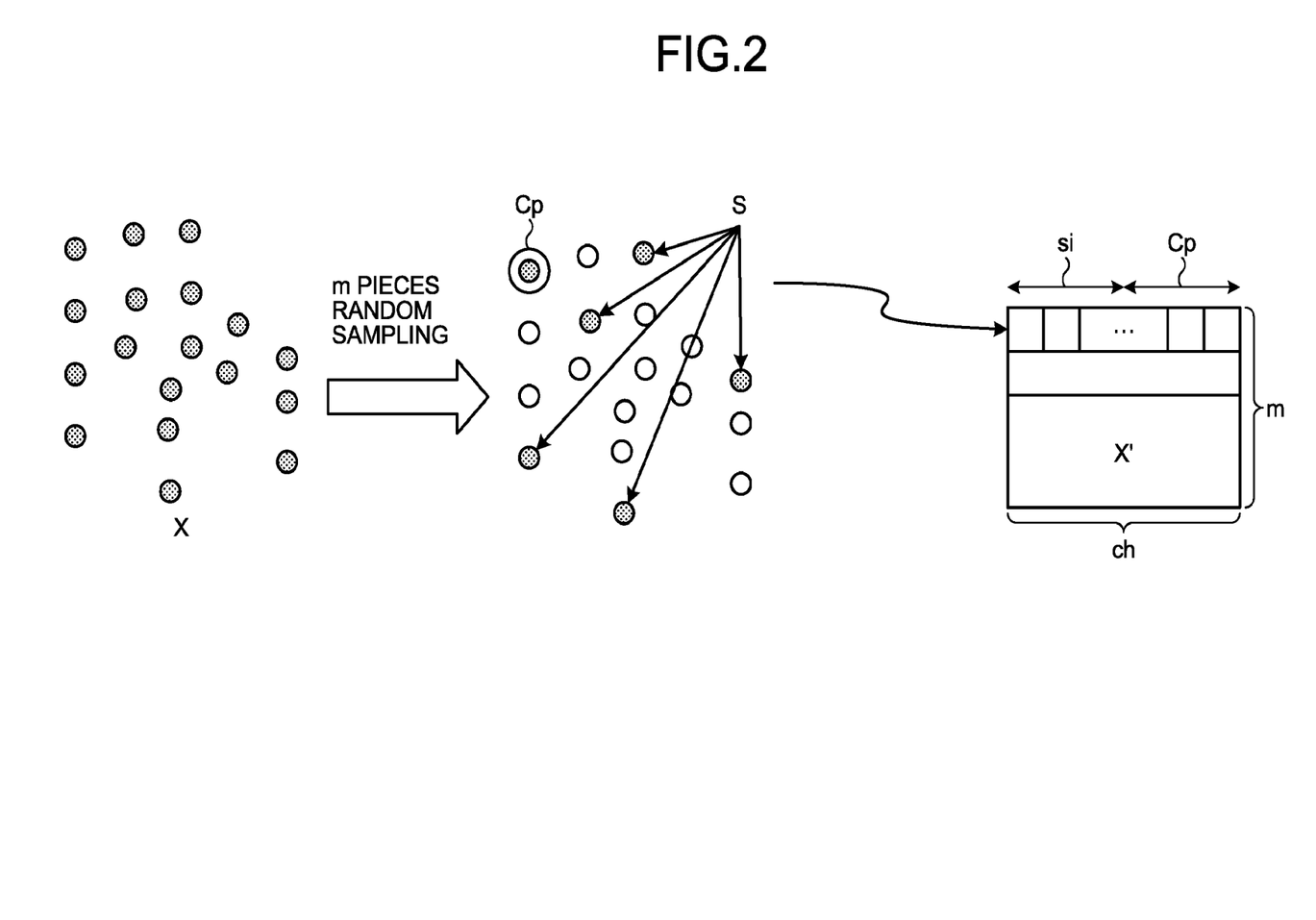
FIG. 2 is a diagram illustrating an example of second point cloud data of the first embodiment.

FIG. 2 is a diagram illustrating an example of second point cloud data X' of the first embodiment. As illustrated in FIG. 2, the combining unit 23 combines the observation point cloud S and the attention point Cp to compose the second point cloud data X' as a single data unit. Specifically, the combining unit 23 performs processing of combining a source si of the observation point cloud S m is the number of observation points included in S) and the attention point Cp on all sources of S. In FIG. 2, ch corresponds to a dimension combined, and ch resulting from the combining has a value obtained by summing the number of elements of the observation point si and the number of elements of the attention point Cp. The observation point si has m types, so that vectors of m types are obtained for a single attention point Cp. Putting those vectors together in the form of a tensor forms the second point cloud data X'.

In FIG. 2, for the sake of simplicity, the case of a single attention point Cp is described. In the case where n pieces of attention points Cp are selected, the second point cloud data X' becomes the tensors of n×m×ch.

Referring back to FIG. 1, the estimation unit 3 estimates the attribute of the attention point Cp by means of deep learning with the input of the second point cloud data X' generated by the combining unit 23.

Figure 3:
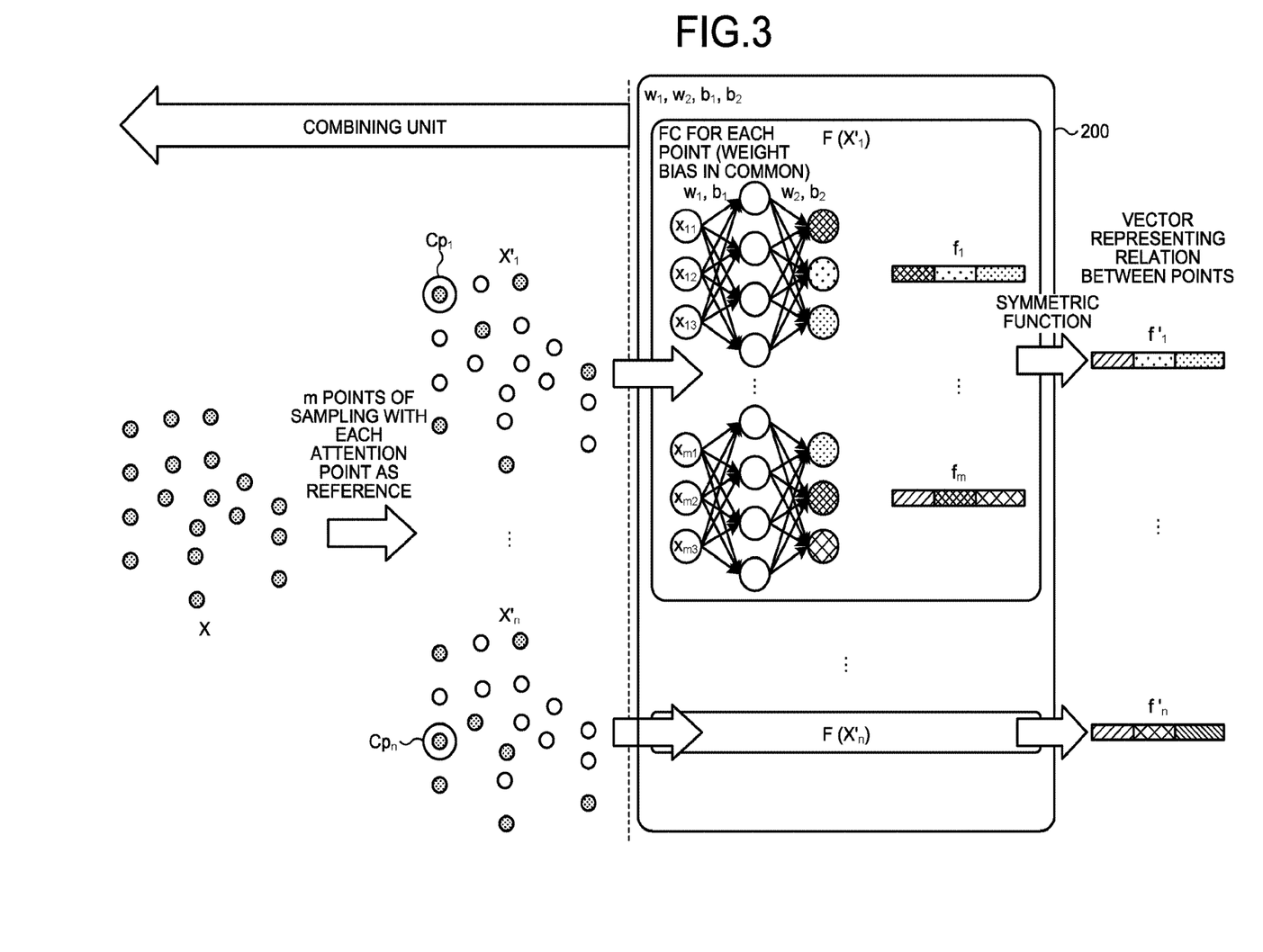
FIG. 3 is a diagram for explaining an operation example of an estimation unit of the first embodiment.

FIG. 3 is a diagram for explaining an operation example of the estimation unit 3 of the first embodiment. F(X) is a function that represents a deep learning network. As illustrated in FIG. 3, the estimation unit 3 inputs, to a neural network 200, X'1 to X'n obtained by dividing the second point cloud data X' in an n direction. The neural network 200 is a deep neural network (DNN), for example.

The estimation unit 3 convolutes X'1 to X'n in the ch direction by all combination layers of the neural network 200. At this time, it should be noted that the convolution is not executed in an m direction. Feature vector groups f1 to fm convoluted by all combination layers are obtained with the same length.

The estimation unit 3 applies a symmetric function to the feature vector groups f1 to fm and obtains a single feature vector f (f-dash) on which the obtained feature vector groups are considered. Specifically, the estimation unit 3 performs the operation of maxpooling that takes a maximum value for each element, and converts them into a single vector, thereby obtaining ultimate feature vectors f1 to fm of the attention estimation. They become a logit of the attention point Cp.

The estimation unit 3 converts this logit into a value that can be handled by the probability of 0 to 1 by a softmax function, as performed in general deep learning, thereby obtaining a belonging probability that represents the probability of belonging to the attribute. That is, the estimation unit 3 calculates a belonging probability for each attribute by the neural network 200 that includes input layers to which the second point cloud data X' is input and output layers from which a belonging probability for each attribute is output.

When the number of elements off does not match the number of attributes c, it only needs to further apply all combination layers to f and adjust f to vectors of the same length as the number of attributes c assumed in advance.

It is assumed that a coefficient of the convolution by deep learning is determined in advance by learning and the like. For example, the coefficient may be determined by: comparing the belonging probability that is ultimately output in the same procedure as that of the first embodiment with the true value; and repeating the operation of adjusting the coefficient in accordance with the deviation. Other than that, it may be determined by using various methods performed in learning the coefficient in the field of deep learning.

Although maxpooling has been used as the symmetric function in the foregoing, there is no need to limit it to this. It only needs to be a symmetric function whose calculation result is not affected by the order of the feature vector groups f1 to fm. It is possible to replace maxpooling with a sum of each element, an average, and the like, for example. Moreover, f may be pre-calculated information on the first point cloud data X. In this case, it only needs to perform the foregoing processing in a state where f is appended to each point of the point cloud data X.

Next, an example of an estimation method of the first embodiment will be described.

Example of Estimation Method

Figure 4:
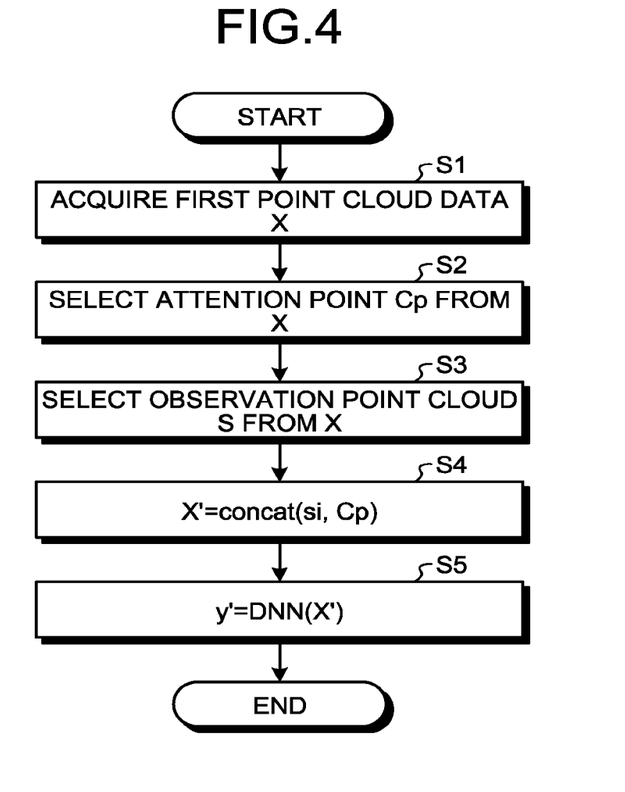
FIG. 4 is a flowchart illustrating an example of an estimation method of the first embodiment.

FIG. 4 is a flowchart illustrating an example of the estimation method of the first embodiment. First, the acquisition unit 1 acquires first point cloud data from an external storage device, a three-dimensional measurement device, and the like (Step S1). Next, the attention-point selection unit 21 selects, from the first point cloud data X acquired by the processing at Step S1, the attention point Cp that gains attention as a target of attribute estimation (Step S2).

Then, the observation-point selection unit 22 selects, from the first point cloud data X acquired by the processing at Step S1, the observation point cloud S including m pieces of observation points si ($0 \le i < m$) (Step S3).

Next, the combining unit 23 generates, from the attention point Cp and the observation point cloud S, the second point cloud data X' as the input data for estimating the attribute of the attention point Cp (Step S4). Concat generates a vector that is obtained by combining the coordinate components of the observation point si and the coordinate components of the attention point Cp. The second point cloud data X' is represented by the tensor in which the components of the generated vector are arrayed (see FIG. 2).

The estimation unit 3 inputs the second point cloud data X' to the neural network 200 (DNN) and obtains an output y' (Step S5). The output y' is, for example, a value in a range of 0 to 1 representing the belonging probability for each attribute.

As described above, in the estimation apparatus 100-1 of the first embodiment, the acquisition unit 1 acquires the first point cloud data X. The input data generator 2 generates, from the first point cloud data X, the second point cloud data X' in which the attention point Cp that gains attention as a target of attribute estimation and at least one observation point s are combined. The estimation unit 3 calculates the belonging probability of belonging to the attribute for each attribute by using the second point cloud data X', thereby estimating the attribute of the attention point Cp.

According to the estimation apparatus 100-1 of the first embodiment, the entire shape represented by the point cloud data X is approximated by resampling (observation point cloud S) and is composed so as to match the attention point CP (second point cloud data X'). This makes it possible, when determining the attribute of the attention point Cp, to consider the entire shape without setting a selection range of points used for calculation clearly. Consequently, according to the estimation apparatus 100-1 of the first embodiment, it is possible to improve the estimation accuracy of the attribute of the point cloud data X.

Second Embodiment

Next, a second embodiment will be described. In the description of the second embodiment, the description the same as that of the first embodiment will be omitted and content differing from the first embodiment will be described.

In the above-described first embodiment, the method of considering the entire shape at practical processing cost by resampling and approximating the shape has been described. The second embodiment is different from the first embodiment in that, the entire shape is more accurately considered by taking the information lost by resampling into consideration statistically.

Example of Functional Configuration

Figure 5:
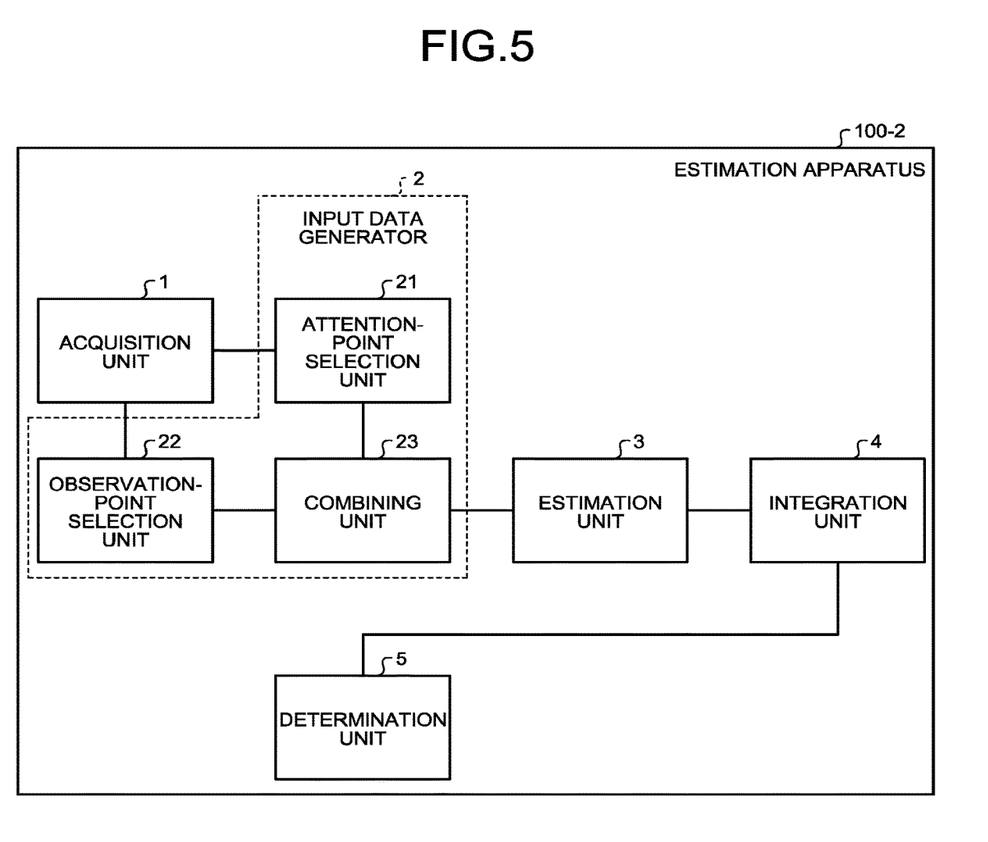
FIG. 5 is a diagram illustrating an example of a functional configuration of an estimation apparatus according to a second embodiment.

FIG. 5 is a diagram illustrating an example of the functional configuration of an estimation apparatus 100-2 of the second embodiment. The estimation apparatus 100-2 of the second embodiment includes the acquisition unit 1, the input data generator 2, the estimation unit 3, an integration unit 4, and a determination unit 5. The input data generator 2 includes the attention-point selection unit 21, the observation-point selection unit 22, and the combining unit 23.

In the second embodiment, the integration unit 4 and the determination unit 5 are introduced. The following describes the processing differing from that of the first embodiment.

The observation-point selection unit 22, the combining unit 23, and the estimation unit 3 of the second embodiment are different from those of the first embodiment in that, they repeat the above-described processing of Step S3 to Step S5 a predetermined number of times LimN. Thus, the output of the estimation unit 3 in the second embodiment is c-dimensional vectors of LimN pieces.

This can be considered equivalent to performing Bayes estimation of the predictive distribution of the output y when a new point x is input. In addition, replacing the dropout in a relative art with the fact that the point included in X is not considered can derive the same conclusion.

The following explains that the processing of repeating the above-described Step S3 through Step S5 is equivalent to performing Bayes estimation of the predictive distribution of the output y when a new point x is input.

During a time when N pieces of input data X and output Y are observed, in a case where a new data $\hat{x}$ ($\hat{x}$ (x hat) represents a symbol in which ^ is over x) is given, the distribution of the prediction value $\hat{y}$ ($\hat{y}$ (y hat) represents a symbol in which ^ is over y) is expressed by the following Expression (1).

$$p(\hat{y}|\hat{x},X,Y)=\int p(\hat{y}|w,\hat{x})p(w|X,Y)dw \quad (1)$$

Since it is difficult to obtain p(w|X, Y) as is at this time, by defining a function $q_\theta(w)$ having a parameter $\theta$ instead, the approximation is performed by minimizing the distance between them, as in the following Expression (2).

$$KL(q_\theta(w)|p(w|X,Y))=\log p(Y|X)-\int q_\theta(w)\log p(Y|X)dw+ KL(q_\theta(w)|p(w)) \quad (2)$$

Organizing the constant term and defining VI($\theta$) as in the following Expression (3) obtains the following Expression (4).

$$VI(\theta) = -\int q_\theta(w)\log p(Y|X)dw + KL(q_\theta(w)|p(w)) \quad (3)$$

$$\min_\theta KL(q_\theta(w)|p(w|X,Y)) = \min_\theta VI(\theta) \quad (4)$$

By assuming that X and Y are independent and that M pieces out of all data are sampled for VI, and replacing $q_\theta(w)$ with the distribution $p(\gamma)$ not having the parameter $\theta$, the following Expression (5) is obtained.

$$\hat{VI} = -\frac{N}{M}\sum_i \int p(\gamma)\log p(y_i|\xi^{g(\theta,\gamma)}(x_i))d\gamma + KL(q_\theta(w)|p(w)) \quad (5)$$

By performing approximation on the integral portion of the above Expression (5) by the Monte Carlo method, the following Expression (6) is obtained.

$$\hat{VI} = -\frac{N}{M}\sum_i \log p(y_i|\xi^{g(\theta,\gamma)}(x_i)) + KL(q_\theta(w)|p(w)) \quad (6)$$

Here, defining the observation points as all points of the input point cloud X and considering the general FC (fully connected), the following Expression (7) is obtained. Note that $\sigma$ denotes an activation function.

$$f_i=\sigma(x_iW+b), 0\leq i\leq n, x\in R^d, W\in R^{d\times m} \quad (7)$$

Moreover, considering the symmetric function portion, the following Expression (8) is obtained.

$$F(X)=\max \text{pool}(T), T=[f_0\ldots f_n] \quad (8)$$

In reality, since the observation points are selected in accordance with a certain probability, the following Expression (9) is obtained.

$$F(X_i)=\max \text{pool}(T\circ Z) \quad (9)$$

Z is a tensor in which f other than those corresponding to the point selected as the observation point is 0, and it is equivalent to the above-described observation point selection by the estimation unit 3 of the second embodiment. Moreover, when ReLU is selected as the activation function $\sigma$, it is expressed by the following Expression (10), so that the following Expression (11) is obtained. The inside of the curly brackets in Expression (11) represents the parameter used by the function. Furthermore, z in the expressions is a rewrite of the observation point selection portion of Expression (9) for the individual point x, and becomes 1 when selected and 0 otherwise.

$$\hat{f}_i = \sigma(x_i W + b) \circ z \quad (10)$$
$$= \sigma((x_i \circ z)W + b \circ z)$$
$$= \sigma(x_i \text{diag}(z)W + b \circ z)$$

$$f' = \xi^{\{diag(z)W, b \circ z\}}(x) \quad (11)$$

When assuming that $g(\theta, \gamma)$ is a function to make the parameter in the curly brackets of the above-described Expression (11), learning W and b to match f' with y is equivalent to learning the parameter that minimizes the above-described VI hat.

Next, an operation of the integration unit 4 and the determination unit 5 will be described.

The integration unit 4 calculates, based on the belonging probability calculated for each second point cloud data X', the integration probability for each attribute. For example, the integration unit 4 obtains, by averaging the c-dimensional vectors of LimN pieces obtained from the estimation unit 3, the integration probability expressed by the c-dimensional vector. That is, the integration probability is an average of a plurality of belonging probabilities calculated for each second point cloud data X' generated a predetermined number of times.

The determination unit 5 determines the attribute having greater integration probability as the attribute of the attention point. For example, the determination unit 5 outputs, as the attribute of the attention point, the attribute corresponding to an element having a maximum value out of the respective elements (components) of the c-dimensional vector obtained from the integration unit 4.

Next, an example of an estimation method of the second embodiment will be described.

Example of Estimation Method

Figure 6:
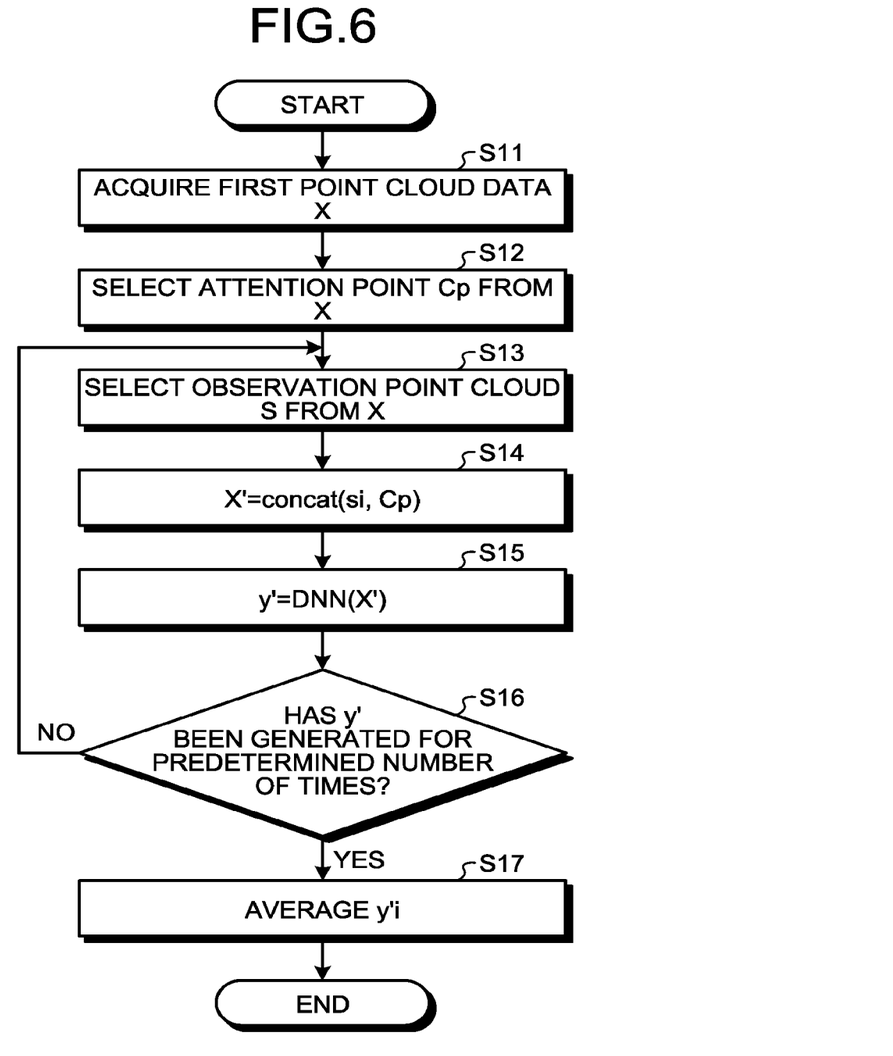
FIG. 6 is a flowchart illustrating an example of an estimation method of the second embodiment.

FIG. 6 is a flowchart illustrating an example of the estimation method of the second embodiment. The processing at Step S11 through Step S15 is the same as the processing at Step S1 through Step S5 of the first embodiment, respectively, and thus the description is omitted.

The integration unit 4 determines whether y' (or the second point cloud data X') has been generated a predetermined number of times (Step S16). When y' has not been generated the predetermined number of times (No at Step S16), the procedure returns to the processing at Step S13.

When y' has been generated the predetermined number of times (Yes at Step S16), the integration unit 4 calculates the integration probability by averaging y'i ($0 \leq i < $LimN) (Step S17).

According to the estimation apparatus 100-2 of the second embodiment, in estimating the attribute of the attention point Cp, the entire shape of the first point cloud data X can be considered in more detail by using a statistical framework.

Third Embodiment

Next, a third embodiment will be described. In the description of the third embodiment, the description the same as that of the second embodiment will be omitted and content differing from the second embodiment will be described.

In the above-described second embodiment, the method of considering the entire shape in more detail by using a statistical framework has been exemplified. In the third embodiment, a case of correcting the result based on a degree of reliability representing reliability of estimation will be described.

Example of Functional Configuration

Figure 7:
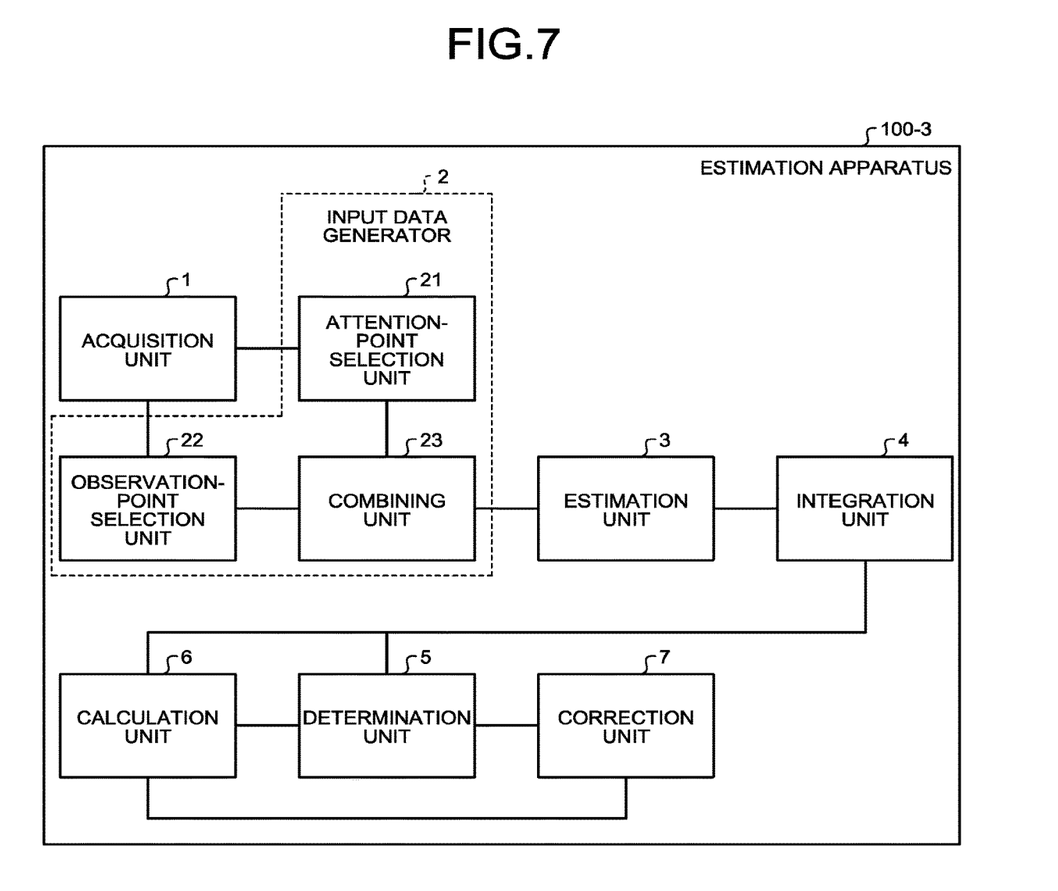
FIG. 7 is a diagram illustrating an example of a functional configuration of an estimation apparatus according to a third embodiment.

FIG. 7 is a diagram illustrating an example of the functional configuration of an estimation apparatus 100-3 of the third embodiment. The estimation apparatus 100-3 of the third embodiment includes the acquisition unit 1, the input data generator 2, the estimation unit 3, the integration unit 4, the determination unit 5, a calculation unit 6, and a correction unit 7. The input data generator 2 includes the attention-point selection unit 21, the observation-point selection unit 22, and the combining unit 23.

In the third embodiment, the calculation unit 6 and the correction unit 7 are introduced, and the operation of the determination unit 5 is different from that of the second embodiment. The following describes the functional blocks whose processing is different from that of the second embodiment.

The calculation unit 6 calculates, based on the integration probability, a degree of reliability representing reliability of estimation. The calculation unit 6 calculates the degree of reliability based on, for example, the c-dimensional vector that was output from the integration unit 4. For the specific calculation of the degree of reliability, the following Expression (12) is used, for example.

$$H(P) = -\sum_{A \in \Omega} P(A) \log P(A) \quad (12)$$

The above Expression (12) represents common entropy, and P(A) corresponds to the c-dimensional vector. As the entropy is greater, it represents that there is less difference among the probabilities corresponding to the respective attributes. Thus, in reality, the calculation unit 6 multiplies the entropy by −1, thereby converting it into the form of the degree of reliability.

When the degree of reliability is below a reliability threshold value, the determination unit 5 determines to repeat, a predetermined additional number of times, the generation of the second point cloud data X' and the calculation of belonging probability. Then, the determination unit 5 determines the attribute of the attention point Cp by the integration probability that is calculated based on the belonging probability further calculated the predetermined additional number of times.

The correction unit 7 corrects the attribute and the degree of reliability of an undetermined attention point by the attribute and the degree of reliability of the attention points whose distance from the undetermined attention point is below a distance threshold value and whose degree of reliability is greater than the reliability threshold value. The undetermined attention point is an attention point whose degree of reliability is below the reliability threshold value or whose attribute is not yet decided. By the processing of the correction unit 7, the estimation apparatus 100-3 according to the third embodiment is able to further stabilize the reliability of the estimation result.

Figure 8:
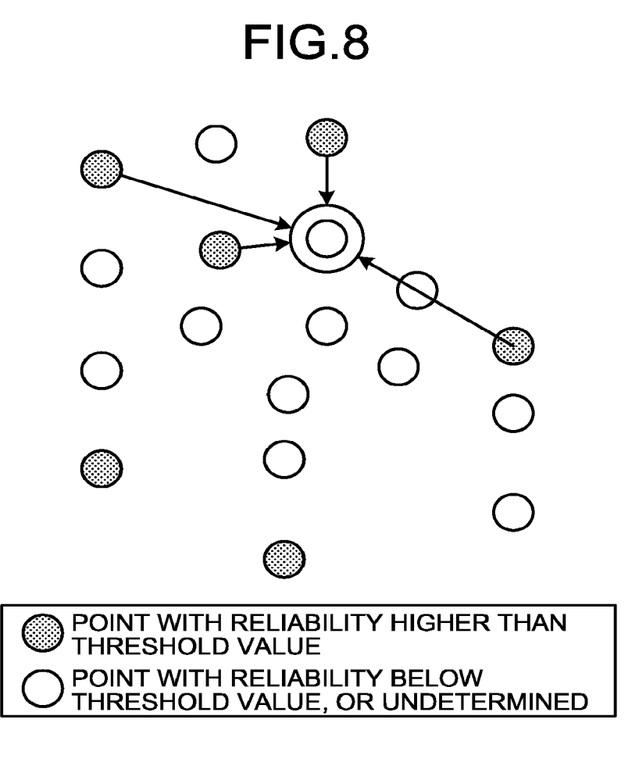
FIG. 8 is a diagram for explaining an operation example of a correction unit of the third embodiment.

FIG. 8 is a diagram for explaining an operation example of the correction unit 7 of the third embodiment. As illustrated in FIG. 8, the correction unit 7 discards the belonging probability and the degree of reliability of the undetermined attention point (point whose degree of reliability is below the threshold value or whose attribute is undetermined). The correction unit 7 corrects the belonging probability and the degree of reliability of the undetermined attention point, by the attribute of the attention point that is present in the vicinity of the undetermined attention point and whose degree of reliability is greater than the reliability threshold value.

Next, an example of an estimation method of the third embodiment will be described.

Example of Estimation Method

Figure 9:
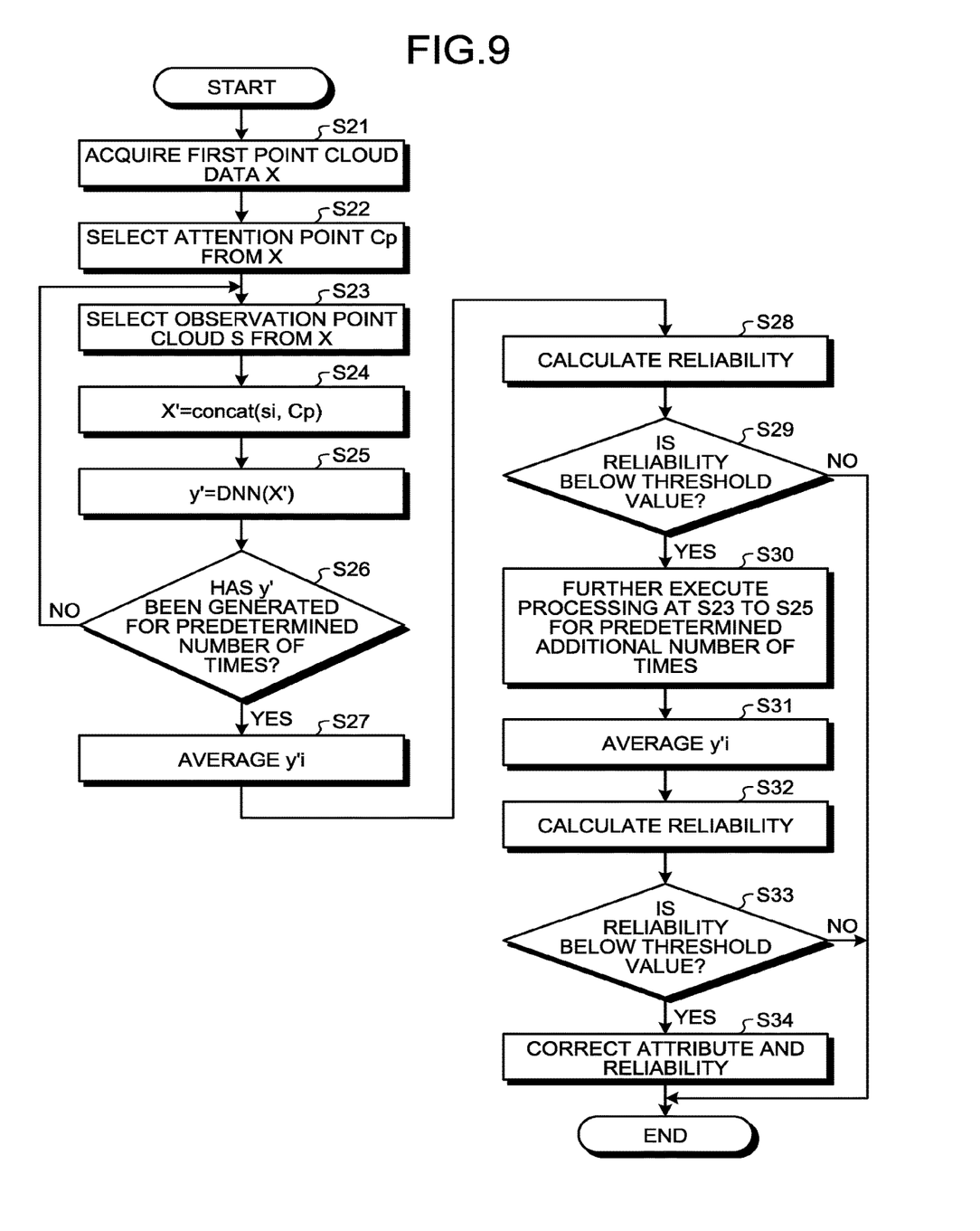
FIG. 9 is a flowchart illustrating an example of an estimation method of the third embodiment.

FIG. 9 is a flowchart illustrating an example of the estimation method of the third embodiment. The processing at Step S21 through Step S27 is the same as the processing at Step S11 through Step S17 of the second embodiment, respectively, and thus the description is omitted.

The calculation unit 6 calculates, based on the integration probability calculated by the processing at Step S27, a degree of reliability representing reliability of estimation (Step S28).

The determination unit 5 then determines whether the degree of reliability that was calculated by the processing at Step S28 is below a reliability threshold value (Step S29). When it is not below the degree of reliability threshold value (No at Step S29), then the processing is ended.

When it is below the reliability threshold value (Yes at Step S29), the estimation apparatus 100-3 further performs the processing at Step S23 through Step S25 a predetermined additional number of times a (Step S30). The integration unit 4 then calculates the integration probability by averaging y'i (0≤i<LimN+α) (Step S31).

Next, the calculation unit 6 calculates, based on the integration probability calculated by the processing at Step S31, a degree of reliability representing reliability of the estimation (Step S32).

The generator 5 then determines whether the degree of reliability calculated by the processing at Step S32 is below the reliability threshold value (Step S33). When the degree of reliability is not below the reliability threshold value (No at Step S33), then the processing is ended.

When the degree of reliability is below the reliability threshold value (Yes at Step S33), the correction unit 7 corrects the attribute and the degree of reliability of the attention point Cp (Step S34). Specifically, the correction unit 7 extracts at least one attention point Cp that is present within a range of the vicinity r of the attention point CP and whose degree of reliability is greater than the reliability threshold value. Then, the correction unit 7 corrects, out of the attributes of the extracted attention points Cp, the attribute by the most attribute and corrects the degree of reliability by the degree of reliability of the relevant attribute.

In the above description, the correction has been made based on the number of the most attributes, out of the attributes of the extracted attention points Cp, but the embodiment is not limited thereto. Various methods that perform the correction from the information on the vicinity are available. For example, conceivable is a method in which the correction unit 7 averages the c-dimensional vectors representing the integration probability for each attribute of the extracted attention point Cp and uses the attribute corresponding to the highest component (element) included in the averaged c-dimensional vector for correction.

The above-described processing of the flowchart in FIG. 9 is one example, and the processing may be changed as appropriate. For example, without performing the processing of both Step S30 and Step S34, either of the both may be performed.

As in the foregoing, according to the estimation apparatus 100-3 of the third embodiment, it is possible to correct the estimation result based on the degree of reliability for each attention point Cp and to perform attribute estimation of higher stability.

Fourth Embodiment

Next, a fourth embodiment will be described. In the description of the fourth embodiment, the description the same as that of the third embodiment will be omitted and content differing from the third embodiment will be described.

In the above-described third embodiment, the method of correcting the estimation result based on the degree of reliability calculated for each attention point Cp has been described. In the fourth embodiment, a method of controlling display of a map that lists reliability levels of estimation based on the degree of reliability will be described.

Example of Functional Configuration

Figure 10:
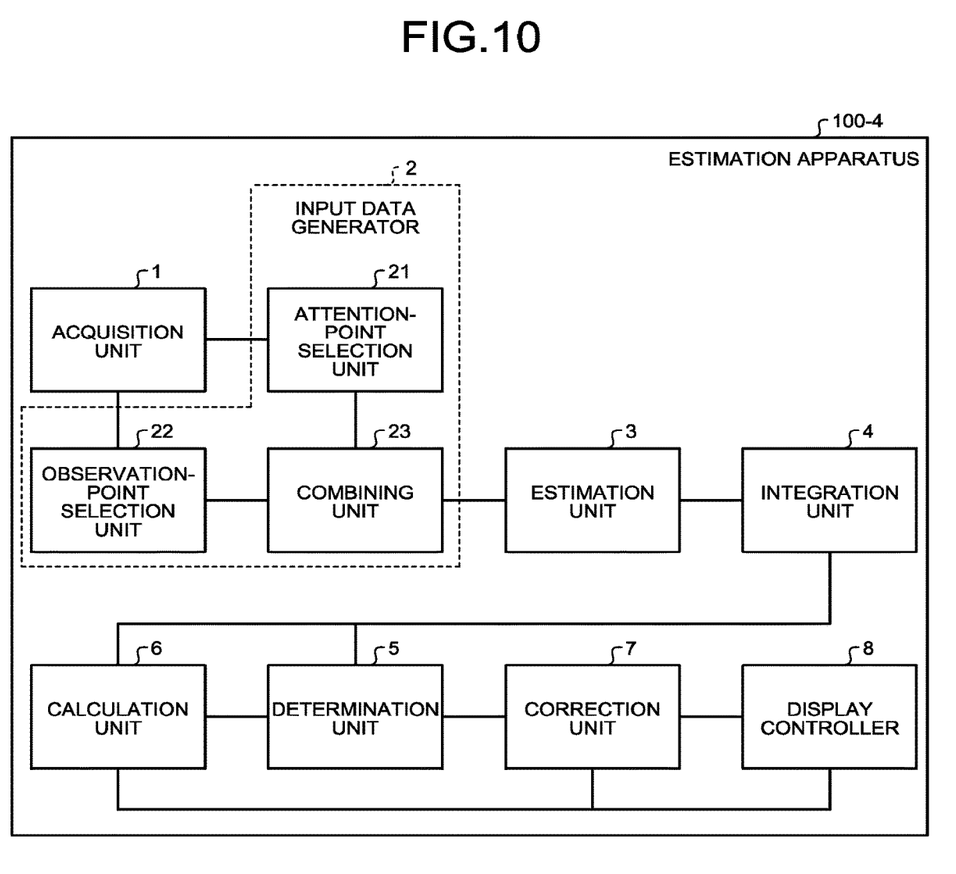
FIG. 10 is a diagram illustrating an example of a functional configuration of an estimation apparatus according to a fourth embodiment.

FIG. 10 is a diagram illustrating an example of the functional configuration of an estimation apparatus 100-4 of the fourth embodiment. The estimation apparatus 100-4 of the fourth embodiment includes the acquisition unit 1, the input data generator 2, the estimation unit 3, the integration unit 4, the determination unit 5, the calculation unit 6, the correction unit 7, and a display controller 8. The input data generator 2 includes the attention-point selection unit 21, the observation-point selection unit 22, and the combining unit 23.

In the fourth embodiment, the display controller 8 is introduced. The display controller 8 controls, based on the reliability, the display of a reliability map representing the reliability of a point x of the first point cloud data X corresponding to the attention point Cp.

Figure 11:
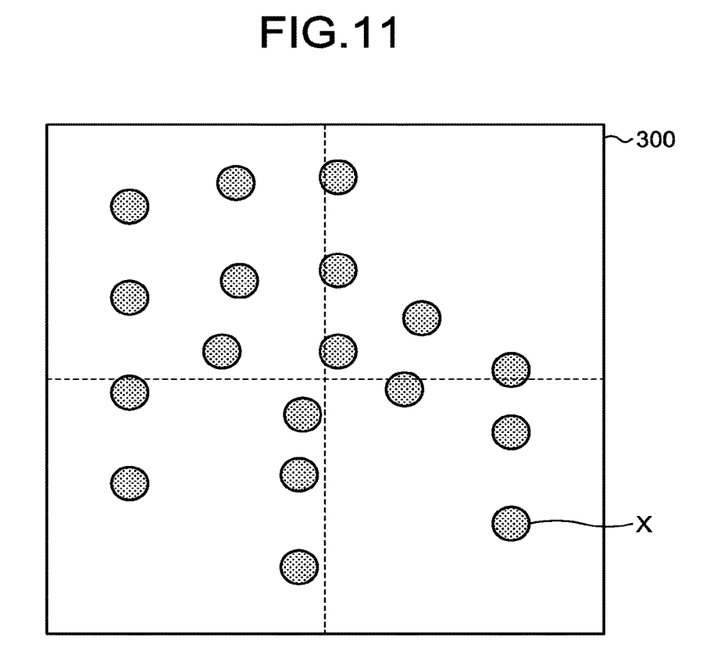
FIG. 11 is a diagram illustrating an example of a reliability map of the fourth embodiment.

FIG. 11 is a diagram illustrating an example of a reliability map 300 of the fourth embodiment. The display controller 8 divides a space where the first point cloud data X is present as illustrated in FIG. 11 into four small spaces, for example, and averages degrees of reliability of the point cloud included in each small space, thereby representing a degree of reliability of the small space. The way of presenting the reliability may be in any desired manner. The degree of reliability may be presented by, for example, the color of the point x or the color of the small space that contains the point x.

Furthermore, the method of determining the degree of reliability of the small space is not limited to averaging, and various methods of data summarization can be considered. For example, for the determination of the degree of reliability of the small space, methods of employing a median value and dispersion are also conceivable.

According to the estimation apparatus 100-4 of the fourth embodiment, it is possible to determine the area on which additional measurements is needed. The estimation apparatus 100-4 of the fourth embodiment can be used to assist in planning in taking additional photos, inspecting measurement quality, and the like, for example.

Lastly, an example of a hardware configuration of the estimation apparatuses 100-1 to 100-4 according to the first to fourth embodiments will be described. In the following description, an example of the estimation apparatus 100-4 of the fourth embodiment will be described. The cases of the estimation apparatuses 100-1 to 100-3 of the first to third embodiments are the same as that of the estimation apparatus 100-4 of the fourth embodiment.

Example of Hardware Configuration

Figure 12:
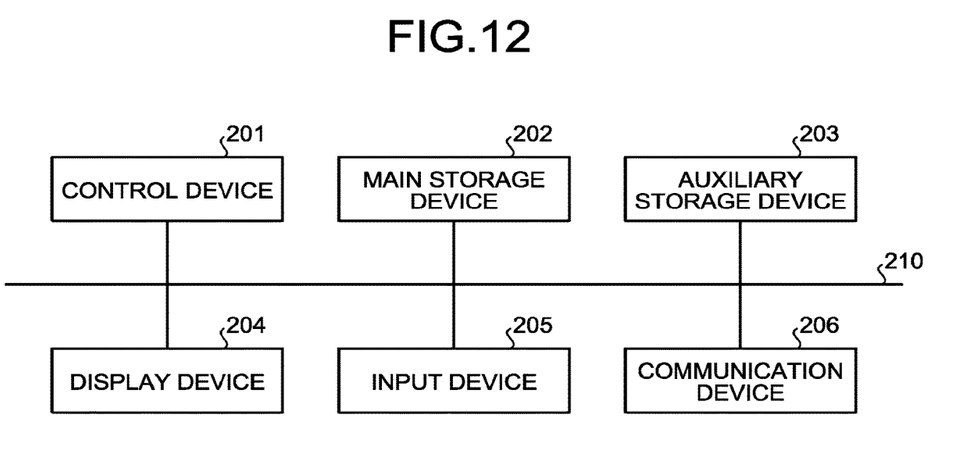
FIG. 12 is a diagram illustrating an example of a hardware configuration of the estimation apparatuses of the first to fourth embodiments.

FIG. 12 is a diagram illustrating an example of a hardware configuration of the estimation apparatuses 100-1 to 100-4 of the first to fourth embodiments. In the following description, an example of the estimation apparatus 100-4 of the fourth embodiment will be described. The cases of the estimation apparatuses 100-1 to 100-3 of the first to third embodiments also are the same as that of the estimation apparatus 100-4 of the fourth embodiment.

The estimation apparatus 100-4 of the fourth embodiment includes a control device 201, a main storage device 202, an auxiliary storage device 203, a display device 204, an input device 205, and a communication device 206. The control device 201, the main storage device 202, the auxiliary storage device 203, the display device 204, the input device 205, and the communication device 206 are connected via a bus 210.

The control device 201 is implemented by one or more hardware processor. The control device 201 executes a computer program that is read out from the auxiliary storage device 203 to the main storage device 202. The main storage device 202 is a memory of a ROM, a RAM, and the like. The auxiliary storage device 203 is a hard disk drive (HDD), a memory card, and the like.

The display device 204 displays information (for example, the above-described reliability map and the like) output by the estimation apparatus 100-4. The display device 204 is, for example, a liquid crystal display and the like. The input device 205 is an interface for operating the estimation apparatus 100-4. The input device 205 is, for example, a keyboard, a mouse, and the like. When the estimation apparatus 100-4 is a smart device such as a smartphone and a tablet device, the display device 204 and the input device 205 are a touch panel, for example.

The communication device 206 is an interface for performing communication with an external storage device, a three-dimensional measurement device, and the like.

The computer program executed in the estimation apparatuses 100-1 to 100-4 of the first to fourth embodiments is recorded in a computer-readable recording medium such as a CD-ROM, a memory card, a CD-R, and a DVD in a file of an installable format or an executable format and provided as a computer program product.

Furthermore, the computer program executed by the estimation apparatuses 100-1 to 100-4 of the first to fourth embodiments may be stored in a computer connected to a network such as the Internet, and be provided by downloading via the network. The computer program executed by the estimation apparatuses 100-1 to 100-4 of the first to fourth embodiments may be provided, without downloading, via a network such as the Internet.

The computer program of the estimation apparatuses 100-1 to 100-4 of the first to fourth embodiments may be provided by programing in a ROM or the like in advance.

The computer program of the estimation apparatuses 100-1 to 100-4 of the first to fourth embodiments is in a modular configuration including, out of the above-described functional blocks (FIG. 1, FIG. 5, FIG. 7, and FIG. 10), the functional blocks that can be implemented even by the computer program. As for each of the relevant functional blocks, as the control device 201 reads out the computer program from a storage medium and executes it as the actual hardware, each of the above-described functional blocks is loaded on the main storage device 202. That is, the above-described various functional blocks are generated on the main storage device 202.

Part of or a whole of the above-described various functional blocks may be implemented by the hardware such as an integrated circuit (IC) instead of being implemented by the software.

When implementing various functions by using a plurality of hardware processors, each processor may implement one out of the various functions or may implement two or more out of the various functions.

The operation mode of the estimation apparatuses 100-1 to 100-4 of the first to fourth embodiments may be in any desired mode. The estimation apparatuses 100-1 to 100-4 of the first to fourth embodiments may be operated as a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation apparatus comprising:
a memory; and
a hardware processor coupled to the memory and configured to:
acquire first point cloud data;
generate, from the first point cloud data, second point cloud data in which an attention point and at least one observation point are combined, the attention point gaining attention as a target of attribute estimation; and
estimate an attribute of the attention point by calculating, for each attribute, a belonging probability of belonging to the attribute by using the second point cloud data.

2. The apparatus according to claim 1,
wherein the hardware processor is further configured to:
select the attention point from the first point cloud data;
select, from the first point cloud data, the observation points of a predetermined number in accordance with a predetermined selection probability; and
generate, for each observation point, a vector obtained by combining coordinate components of the observation point and coordinate components of the attention point, and
wherein the second point cloud data is represented by a tensor in which components of the vector are arrayed.

3. The apparatus according to claim 1, wherein the hardware processor carries out the calculation of the belonging probability for each attribute by a neural network including an input layer to which the second point cloud data is input and an output layer from which the belonging probability for each attribute is output.

4. The apparatus according to claim 1, wherein the hardware processor is further configured to:
repeat, a predetermined number of times, generation processing of the second point cloud data;
calculate the belonging probability for each second point cloud data generated the predetermined number of times; and
calculate an integration probability for each attribute based on the belonging probability calculated for each second point cloud data.

5. The apparatus according to claim 4, wherein the integration probability is an average of a plurality of belonging probabilities calculated for each second point cloud data generated the predetermined number of times.

6. The apparatus according to claim 4, wherein the hardware processor is further configured to determine an attribute having a greater integration probability as the attribute of the attention point.

7. The apparatus according to claim 6, wherein the hardware processor is further configured to:
calculate, based on the integration probability, a degree of reliability representing reliability of estimation;
determine, when the degree of reliability is below a reliability threshold value, to repeat, a predetermined additional number of times, generation of the second point cloud data and calculation of the belonging probability; and
determine the attribute of the attention point by using the integration probability calculated based further on a belonging probability that is further calculated the predetermined additional number of times.

8. The apparatus according to claim 6, wherein the hardware processor is further configured to:
calculate, based on the integration probability, a degree of reliability representing reliability of estimation; and
correct an attribute and a degree of reliability of an undetermined attention point whose degree of reliability is below a reliability threshold value or whose attribute is undetermined, by an attribute and a degree of reliability of an attention point whose distance from the undetermined attention point is below a distance threshold value and whose degree of reliability is greater than the reliability threshold value.

9. The apparatus according to claim 6, wherein the hardware processor is further configured to:
calculate, based on the integration probability, a degree of reliability representing reliability of estimation; and
control, based on the degree of reliability, display of a reliability map representing a degree of reliability of a point of the first point cloud data corresponding to the attention point.

10. An estimation method implemented by a computer, the method comprising:
acquiring first point cloud data;
generating, from the first point cloud data, second point cloud data in which an attention point and at least one observation point are combined, the attention point gaining attention as a target of attribute estimation; and
estimating an attribute of the attention point by calculating, for each attribute, a belonging probability of belonging to the attribute by using the second point cloud data.

11. The method according to claim 10,
wherein the generating includes:
selecting the attention point from the first point cloud data;
selecting, from the first point cloud data, the observation points of a predetermined number in accordance with a predetermined selection probability; and
generating, for each observation point, a vector obtained by combining coordinate components of the observation point and coordinate components of the attention point, and
wherein the second point cloud data is represented by a tensor in which components of the vector are arrayed.

12. The method according to claim 10, wherein the calculation of the belonging probability for each attribute in the estimating is carried out by a neural network including an input layer to which the second point cloud data is input and an output layer from which the belonging probability for each attribute is output.

13. The method according to claim 10, wherein
the generating includes repeating, a predetermined number of times, generation processing of the second point cloud data,
the estimating includes calculating the belonging probability for each second point cloud data generated the predetermined number of times, and
the method further comprises calculating an integration probability for each attribute based on the belonging probability calculated for each second point cloud data.

14. The method according to claim 13, wherein the integration probability is an average of a plurality of belonging probabilities calculated for each second point cloud data generated the predetermined number of times.

15. The method according to claim 13, further comprising determining an attribute having a greater integration probability as the attribute of the attention point.

16. The method according to claim 15, further comprising calculating, based on the integration probability, a degree of reliability representing reliability of estimation,
wherein the determining the attribute includes:
determining, when the degree of reliability is below a reliability threshold value, to repeat, a predetermined additional number of times, generation of the second point cloud data and calculation of the belonging probability; and
determining the attribute of the attention point by using the integration probability calculated based further on a belonging probability that is further calculated the predetermined additional number of times.

17. The method according to claim 15, further comprising:
calculating, based on the integration probability, a degree of reliability representing reliability of estimation; and
correcting an attribute and a degree of reliability of an undetermined attention point whose degree of reliability is below a reliability threshold value or whose attribute is undetermined, by an attribute and a degree of reliability of an attention point whose distance from the undetermined attention point is below a distance threshold value and whose degree of reliability is greater than the reliability threshold value.

18. The method according to claim 15, further comprising:
calculating, based on the integration probability, a degree of reliability representing reliability of estimation; and
controlling, based on the degree of reliability, display of a reliability map representing a degree of reliability of a point of the first point cloud data corresponding to the attention point.

19. A computer program product comprising a non-transitory computer-readable recording medium on which an executable program is recorded, the program instructing a computer to:
acquire first point cloud data;
generate, from the first point cloud data, second point cloud data in which an attention point and at least one observation point are combined, the attention point gaining attention as a target of attribute estimation; and
estimate an attribute of the attention point by calculating, for each attribute, a belonging probability of belonging to the attribute by using the second point cloud data.

20. The computer program product according to claim 19, wherein the program further instructs the computer to:
select the attention point from the first point cloud data;

select, from the first point cloud data, the observation points of a predetermined number in accordance with a predetermined selection probability; and generate, for each observation point, a vector obtained by combining coordinate components of the observation point and coordinate components of the attention point, and wherein the second point cloud data is represented by a tensor in which components of the vector are arrayed.

21. The computer program product according to claim 19, wherein the program instructs the computer to carry out the calculation of the belonging probability for each attribute by a neural network including an input layer to which the second point cloud data is input and an output layer from which the belonging probability for each attribute is output.

22. The computer program product according to claim 19, wherein the program further instructs the computer to:

repeat, a predetermined number of times, generation processing of the second point cloud data;

calculate the belonging probability for each second point cloud data generated the predetermined number of times; and calculate an integration probability for each attribute based on the belonging probability calculated for each second point cloud data.

23. The computer program product according to claim 22, wherein the integration probability is an average of a plurality of belonging probabilities calculated for each second point cloud data generated the predetermined number of times.

24. The computer program product according to claim 22, wherein the program further instructs the computer to determine an attribute having a greater integration probability as the attribute of the attention point.

25. The computer program product according to claim 24, wherein the program further instructs the computer to:

calculate, based on the integration probability, a degree of reliability representing reliability of estimation;

determine, when the degree of reliability is below a reliability threshold value, to repeat, a predetermined additional number of times, generation of the second point cloud data and calculation of the belonging probability; and determine the attribute of the attention point by using the integration probability calculated based further on a belonging probability that is further calculated the predetermined additional number of times.

26. The computer program product according to claim 24, wherein the program further instructs the computer to:

calculate, based on the integration probability, a degree of reliability representing reliability of estimation; and correct an attribute and a degree of reliability of an undetermined attention point whose degree of reliability is below a reliability threshold value or whose attribute is undetermined, by an attribute and a degree of reliability of an attention point whose distance from the undetermined attention point is below a distance threshold value and whose degree of reliability is greater than the reliability threshold value.

27. The computer program product according to claim 24, wherein the program further instructs the computer to:

calculate, based on the integration probability, a degree of reliability representing reliability of estimation; and control, based on the degree of reliability, display of a reliability map representing a degree of reliability of a point of the first point cloud data corresponding to the attention point.

\* \* \* \* \*